H. Y. ARMSTRONG.
PACKAGING MACHINE.
APPLICATION FILED DEC. 4, 1914.

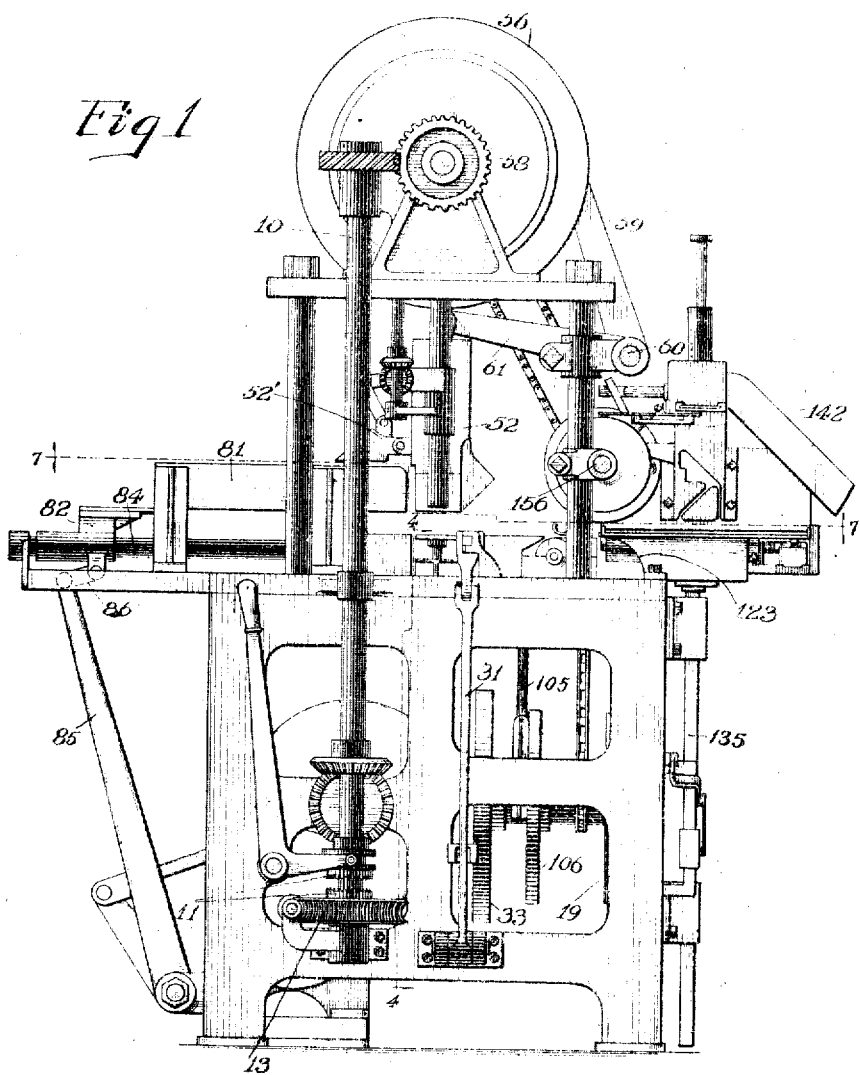

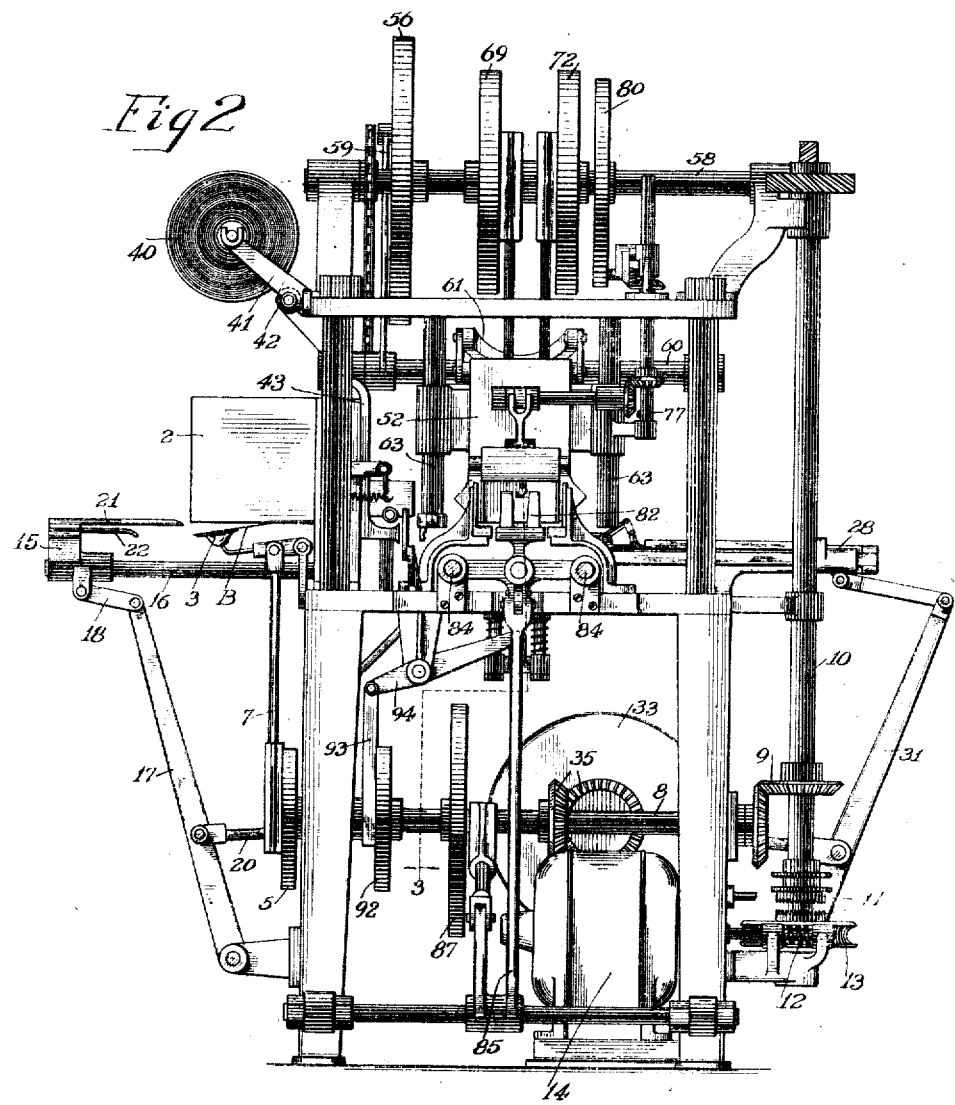

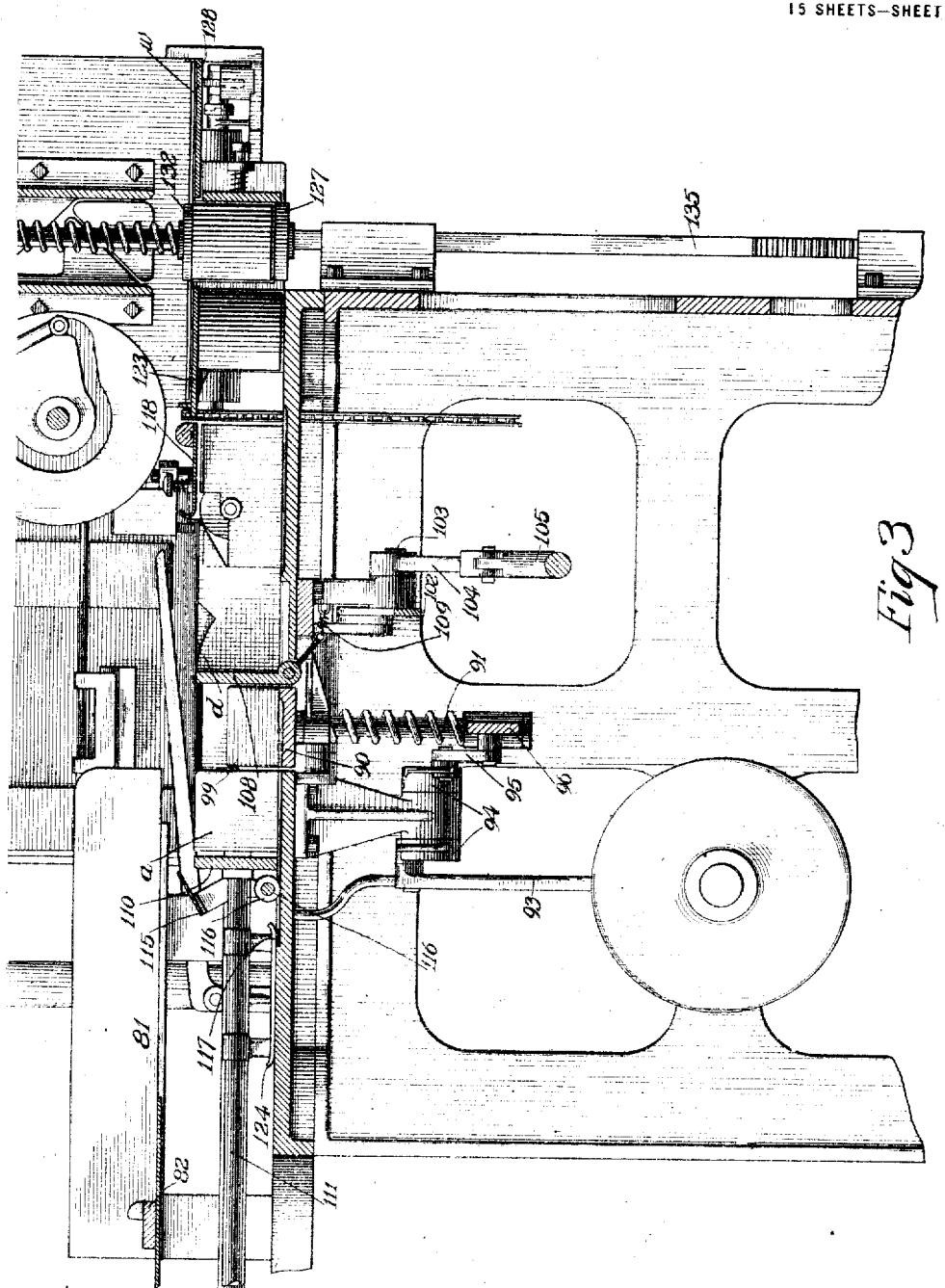

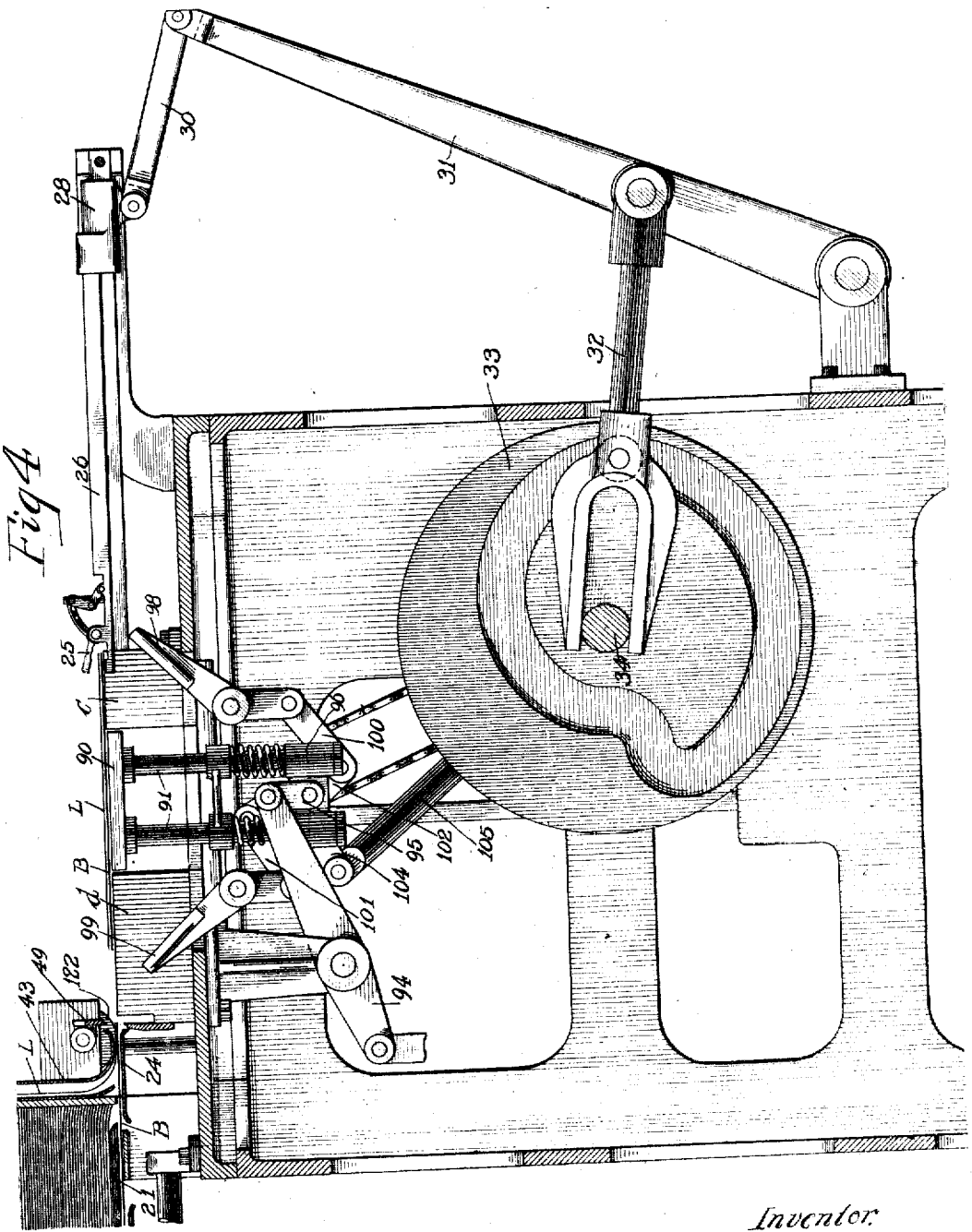

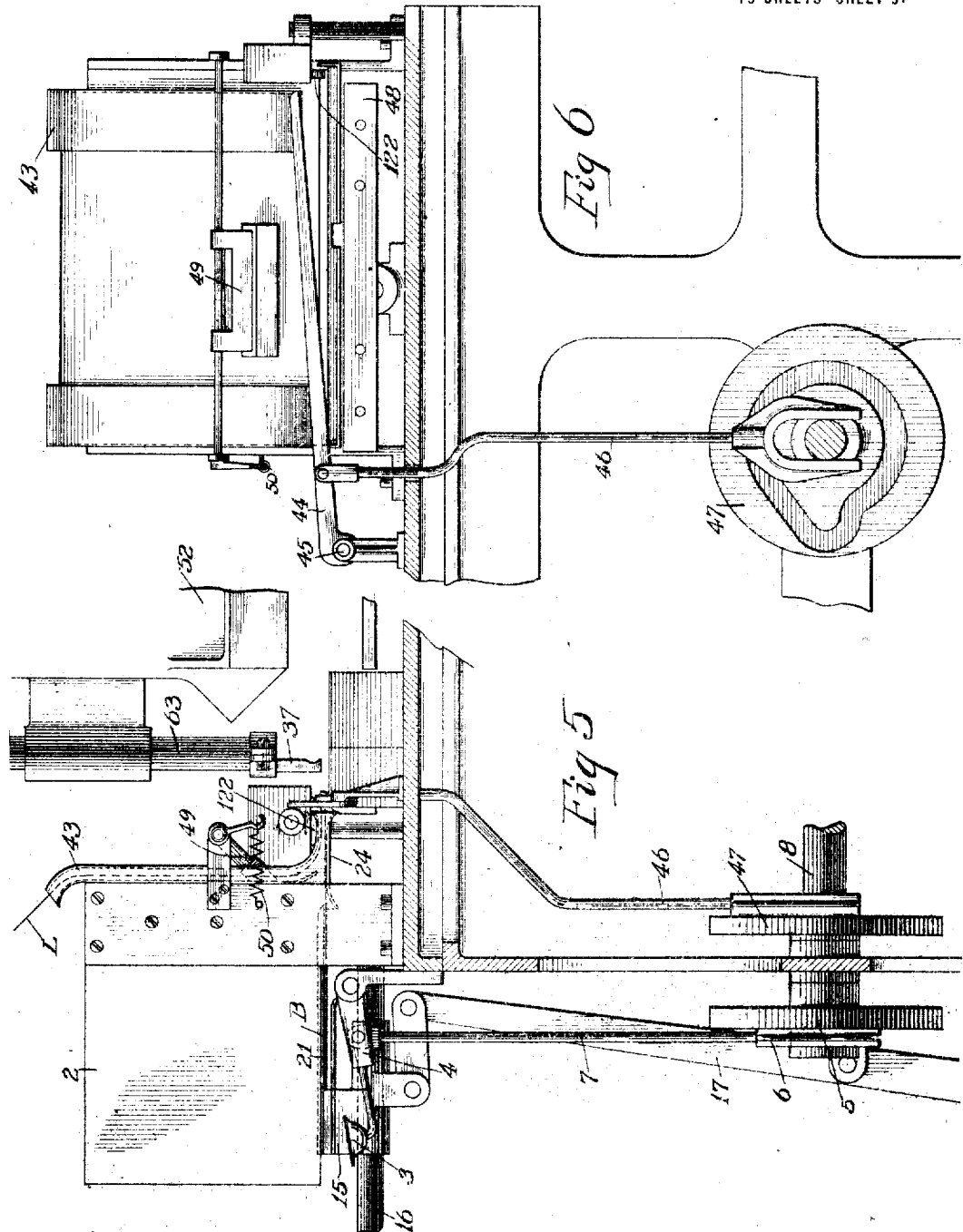

1,295,951.

Patented Mar. 4, 1919
15 SHEETS—SHEET 6.

Witnesses.
W. C. Ross
J. H. McCready

Inventor.
Harry Y. Armstrong
by his attorneys
Putnam, Putnam & Bell

H. Y. ARMSTRONG.
PACKAGING MACHINE.
APPLICATION FILED DEC. 4, 1914.

1,295,951.

Patented Mar. 4, 1919.
15 SHEETS—SHEET 7.

Witnesses.
W. C. Ross.
J. H. McCready.

Inventor.
Harry Y. Armstrong
by his attorney

H. Y. ARMSTRONG.
PACKAGING MACHINE.
APPLICATION FILED DEC. 4, 1914.

1,295,951.

Patented Mar. 4, 1919.
15 SHEETS—SHEET 8.

Witnesses

Inventor.

H. Y. ARMSTRONG.
PACKAGING MACHINE.
APPLICATION FILED DEC. 4, 1914.
1,295,951.
Patented Mar. 4, 1919.
15 SHEETS—SHEET 9.
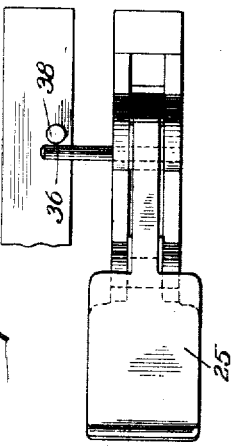
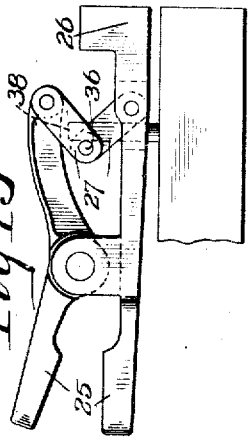
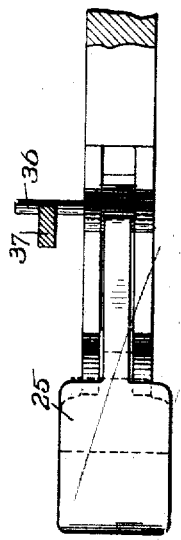
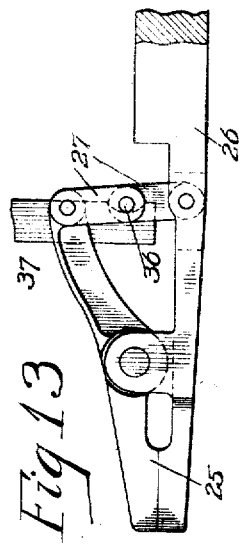

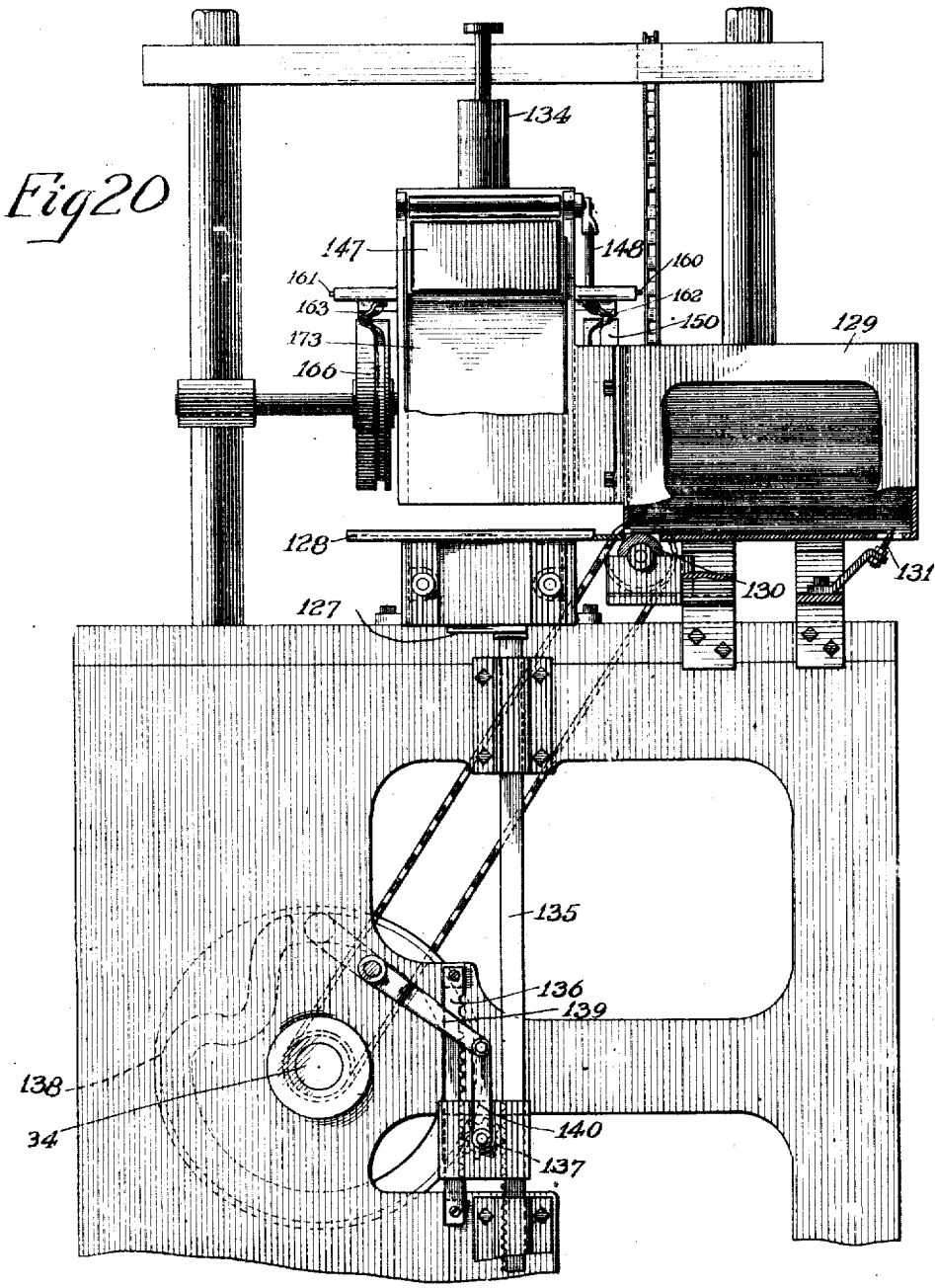

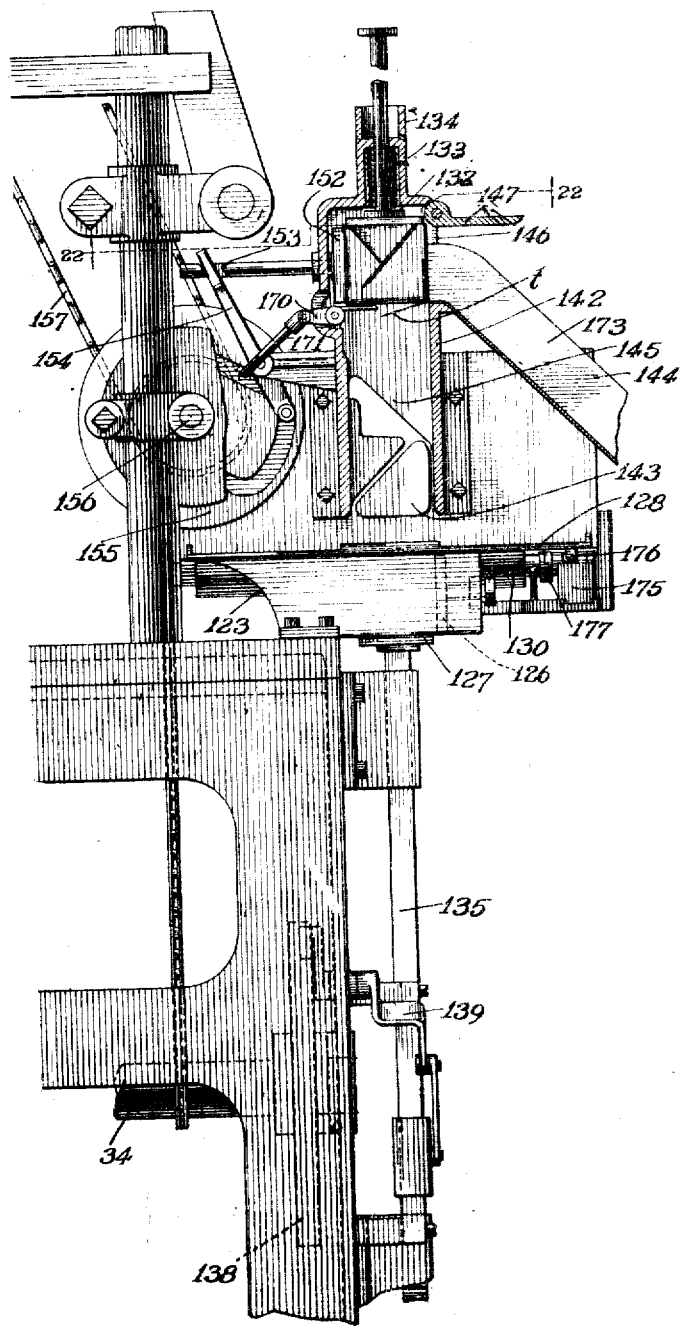

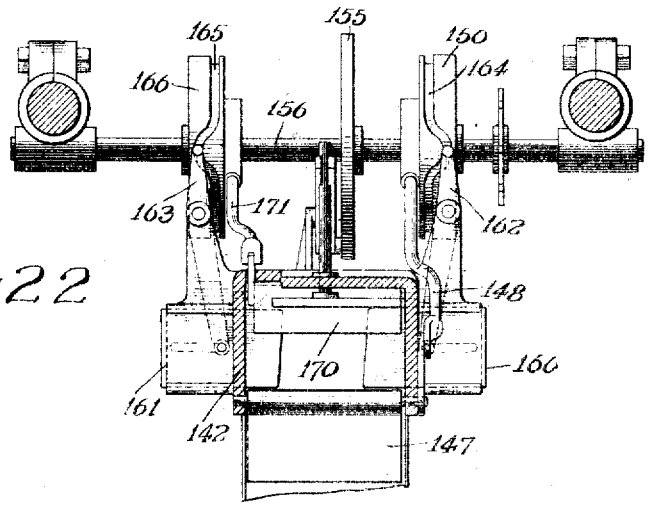
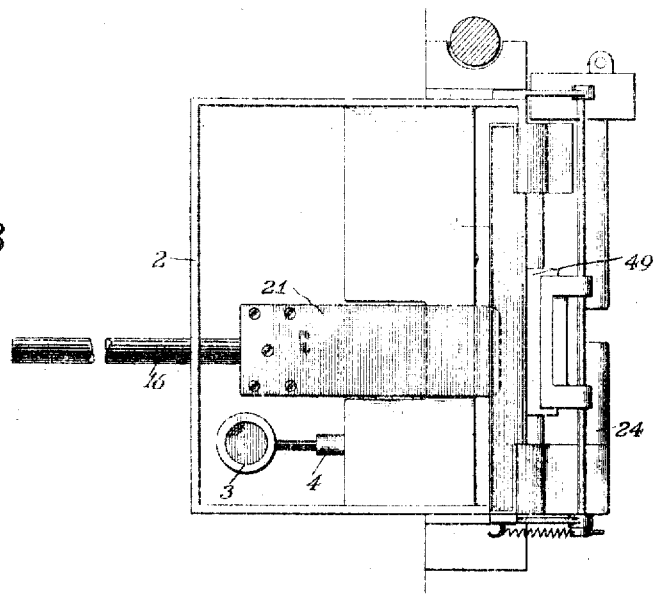

H. Y. ARMSTRONG.
PACKAGING MACHINE.
APPLICATION FILED DEC. 4, 1914.

1,295,951.

Patented Mar. 4, 1919.
15 SHEETS—SHEET 15.

Witnesses.
W. C. Ross.
J. H. McCrady.

Inventor.
Harry Y. Armstrong
by his attorneys
Putnam Putnam & Bell

UNITED STATES PATENT OFFICE.

HARRY YARRINGTON ARMSTRONG, OF SPRINGFIELD, MASSACHUSETTS, ASSIGNOR TO PACKAGE MACHINERY COMPANY, OF SPRINGFIELD, MASSACHUSETTS, A CORPORATION OF MASSACHUSETTS.

PACKAGING-MACHINE.

1,295,951.  Specification of Letters Patent.  Patented Mar. 4, 1919.

Application filed December 4, 1914.  Serial No. 875,50⁻

*To all whom it may concern:*

Be it known that I, HARRY Y. ARMSTRONG, a citizen of the United States, residing at Springfield, in the county of Hampden and State of Massachusetts, have invented certain new and useful Improvements in Packaging-Machines, of which the following description, in connection with the accompanying drawings, is a specification, like reference characters on the drawings indicating like parts in the several figures.

In the packaging of merchandise many different practices are followed, depending chiefly on the nature of the goods to be packaged, the taste of the manufacturer and the demands of the trade. In some cases the merchandise is merely inclosed in a carton while, in other cases, the goods are first wrapped in an inner wrapper or carton lining and then inserted in a carton; and in still other cases, the carton, whether lined or not, is wrapped in an outer wrapper which bears advertising matter or has some distinctive or decorative design. The present invention provides a machine that will package merchandise in any one of these ways, and which can be used for packaging either solid articles, such as prints of butter, or loose or granular material, such, for instance, as tea or coffee.

The invention will be readily understood from the following description, reference being made to the accompanying drawings, in which, Figure 1 is a front elevation of a machine constructed in accordance with the invention;

Fig. 2 is a side elevation of the machine shown in Fig. 1;

Fig. 3 is a vertical sectional view on the line 3—3, Fig. 2;

Fig. 4 is a vertical sectional view on the line 4—4, Fig. 1;

Fig. 5 is a sectional view showing certain parts of the mechanism for feeding the carton blanks;

Fig. 6 is a sectional view showing in elevation certain of the parts shown in Fig. 5;

Figs. 12 to 15, inclusive, are views of the gripper forming part of the carton feeding mechanism;

Figs. 16 to 19, inclusive, are a series of views of the carton folding mechanism showing successive steps in the operation of folding up and filling a carton;

Fig. 20 is an elevation partly in section of the mechanism for folding the outside wrapper about the carton after it has been filled and closed;

Fig. 21 is an elevation, partly in section, of the mechanism shown in Fig. 20 but looking at right angles to the view shown in Fig. 20;

Fig. 22 is a sectional view on the plane indicated by the line 22—22, Fig. 21;

Fig. 23 is a plan view of the magazine for the carton blanks;

Figs. 24 to 30, inclusive, are perspective views showing the successive steps in the operation of forming up a carton and closing it; and Figs. 31 to 37, inclusive, are perspective views showing different steps in the operation of wrapping the carton in an outside wrapper.

Briefly stated, the machine shown is designed to fold up together a carton and a carton lining to prepare the carton for the filling operation, then to fill the carton, to fold down and glue the flaps of the carton, and finally to wrap the carton in an outside wrapper.

Figure 7:
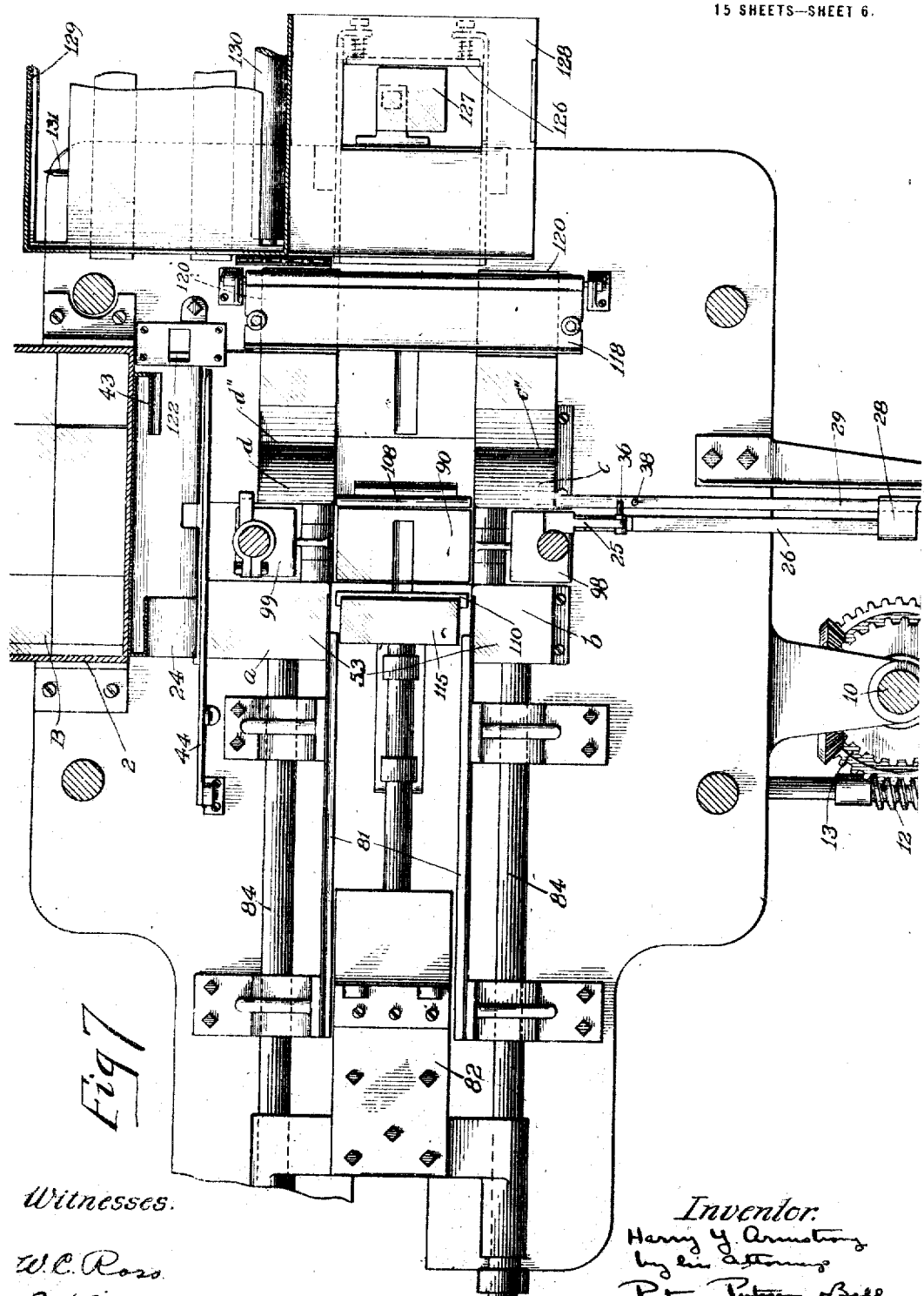
Fig. 7 is a horizontal sectional view on the plane indicated by the line 7—7, Fig. 1.
Figure 24:
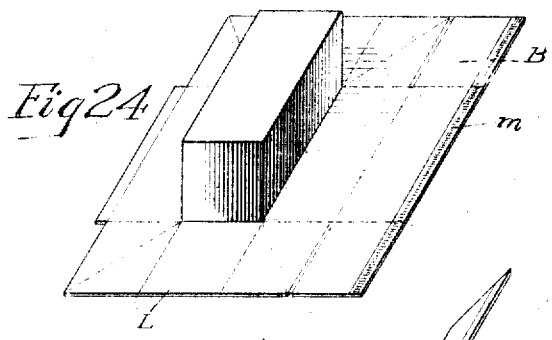
Figure 25:
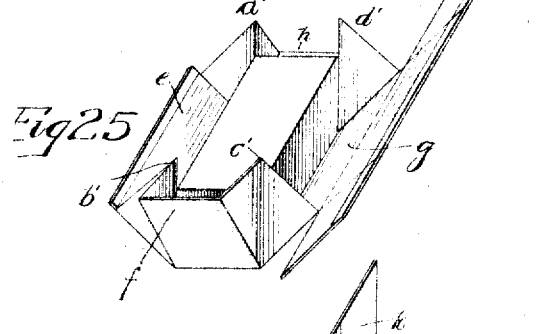

Referring now to the drawings, and particularly to Figs. 5, 6, 7 and 23, a magazine adapted to hold a stack of carton blanks is indicated at 2. These blanks, which are shown at B in Figs. 7 and 24, are of the character shown and described in Patent No. 1,068,802, granted to Merrell and Amidon July 29, 1913, but it will, of course, be understood that the invention is not limited to use with a carton of this specific character. The carton blanks are fed one at a time from the bottom of the magazine and for the purpose of enabling the feeding mechanism to select only the bottommost blank, a suction cup or sucker 3 is mounted below the magazine 2 on an arm 4 that is pivoted to the machine frame. This cup is of the usual construction, generally made of rubber, so that, when pressed against the bottommost carton blank in the stack, and then moved away again, it will deflect this blank away from the other blanks in the stack. The necessary motion is given to the sucker 3 by means of a cam 5 arranged to operate a cam head 6 which is connected by means of a rod 7 to the sucker arm 4, the cam 5 being mounted fast on the main shaft 8 of the machine. This shaft, as shown in Fig. 2, is driven by means of a pair of bevel gears 9, a vertical shaft 10 and a clutch 11, one member of said clutch being driven through a worm 12 and a worm wheel 13 from a small electric motor 14 that furnishes power for the whole machine. The sucker 3 is arranged to engage the bottommost blank in the magazine 2 near its rear edge, and the magazine is so constructed (see Fig. 23) that it does not support the blanks near this edge and thus allows the sucker to bend the edge of the blank downwardly in the manner above described.

The blank is moved out from under the other blanks in the stack by a feeder 15 (see Figs. 2 and 5) which is mounted to reciprocate back and forth under the magazine on a pair of guides 16. Movement is imparted to the feeder by means of a lever 17 fulcrumed on a bracket projecting from the machine frame and connected with the feeder 15 by a link 18, this lever being driven by a cam 19 (see Fig. 1) and a connecting rod 20 operated by said cam and pivoted to the lever 17. The cam 19 is mounted on a cross shaft that is driven through bevel gears 35 from the main shaft 8. The feeder 15 carries a pair of fingers arranged one above the other with a space between them. The upper finger 21 projects forward for a considerable distance in front of the feeder head and has a thin forward end, while the lower finger 22 is shorter and has its forward end curved away from the upper finger 21. These fingers are so positioned with reference to the bottom of the magazine that, as the feeder is moved forward the upper finger will slide through the bottom of the magazine above the lowermost blank which has been bent into the position shown in Fig. 2 by means of the sucker 3 and the lower finger will slide under the blank so that the edge of the blank will be guided into the space between the fingers 21 and 22. The magazine, of course, is constructed to permit this movement, as indicated in Fig. 23. As the feeder continues its forward movement, the upper finger 21 raises the other blanks in the stack (see Fig. 4) and thus relieves the pressure on the lowermost blank at the same time that the feeder, by pressing against the rear edge of the blank, forces its forward edge out of the front of the magazine and through the open end of a short delivery nozzle 24 that projects from the front of the magazine. The feeder then retires to the backward limit of its stroke leaving the blank in its advanced position, as indicated in Fig. 4.

The blank is delivered to the folding mechanism by means of a gripper 25 which is best shown in Figs. 4 and 12 to 15. This gripper comprises a pair of jaws mounted on a slide 26 and connected together by a pair of toggle links 27 which serve to open or close them. The slide 26 is carried by a cross head 28 mounted to reciprocate on a stationary guide 29 (see Fig. 7) and connected by means of a link 30 to a lever 31 (see Fig. 4) that is operated by a connecting rod 32 carrying a cam roll which runs in the groove of a cam 33 mounted on a shaft 34. This is the shaft that carries the cam 19, and is driven from the main shaft 8 by a pair of bevel gears indicated at 35, Fig. 2. The cam 33 and its connections with the gripper 25 are designed to move the gripper forward to the end of the nozzle or chute 24 in position to grasp the edge of the carton blank B that has been advanced by the feeder 15. When the gripper has reached this point, the pivot 36 that connects the two toggle links 27 and projects to one side of the gripper, strikes a stop 37 (see Figs. 5 and 13) that is secured to a stationary part of the machine, and straightens the toggle, thus closing the gripper as indicated in Fig. 13, and causing it to grasp the edge of the carton blank. The return movement of the gripper causes it to pull the blank out from under the other blanks in the magazine 2 and carry it to the wrapping mechanism. At this point another stop 38 mounted on the guide 29, strikes the pivot pin 36 and collapses the toggle, thus opening the gripper and causing it to release the blank.

The lining for the carton preferably is fed to the wrapping mechanism superimposed on the carton blank. This lining is supplied in the form of a continuous strip of paper fed from the roll 40 (see Fig. 2) which is mounted to rotate slowly in bearings formed in a bracket 41 projecting from one side of the machine. The strip of paper is carried over a guide roller 42 also mounted in bearings in the bracket 41 and is then carried through a guide chute 43 (see Figs. 2 and 5) that is supported at the front of the magazine 2 and merges at its lower end into the nozzle 24. When the grippers 25 move forward to grasp the carton blank B in the manner above described, they also grasp the forward edge of the carton lining L and carry it forward to the wrapping mechanism with the blank. The lining strip is then cut off just in front of the nozzle 24 by a shear 44 fulcrumed on the machine frame at 45 (see Fig. 6) and operated by a rod 46 which is moved up and down by means of a cam 47 fast on the main shaft 8. This shear coöperates with a stationary shearing blade 48 that lies just under the path of the carton blank and carton lining as they leave the nozzle 24. In order to prevent the strip of lining L from being drawn back by any reverse movement of the roll 40 a stop 49 is pivoted in front of the shute 43 and is held yieldingly in contact with the strip of paper as it feeds through the shute by means of a spring 50. This stop is provided with a rubber or leather end to bear against the paper, as usual in devices of this character, and its mounting is such, as will be evident from an inspection of Fig. 5, that it does not interfere with the forward movement of the lining strip but prevents any backward movement of it.

The carton blank and its lining now having been delivered to the folding mechanism, these parts are ready for the operation of the carton forming devices.

The initial carton folding or forming operations are performed by a mandrel 52 and a stationary die indicated as a whole by the numeral 53 and comprising four stationary members shown in Fig. 7 at $a$, $b$, $c$ and $d$. These members are so placed that they leave between them a rectangular space the corners of which rectangle just meet the adjacent corners of the members $a$, $b$, $c$ and $d$. This rectangular space is the space in which the carton will be formed and is of substantially the same dimensions as the carton. The mandrel 52 is rectangular in cross-section through the part that enters the die 53 but is provided with four wings 54 that project from its four sides and are inclined upwardly from the bottom of the mandrel. These wings are adapted to enter, respectively, the spaces between the adjacent sides of the members $a$, $b$, $c$ and $d$ of the die. The die 53 has a flat upper surface except where notches $c''$ and $d''$ are formed in the members $c$ and $d$, respectively, to accommodate the flaps of the carton. The operative movement of the mandrel into and out of the die is produced by a cam 56 (see Figs. 1 and 2) mounted on a shaft 58 at the head of the machine and which is driven by a pair of spiral gears one on the shaft 58 and the other on the vertical shaft 10. The cam 56 has a cam way in which runs a cam roll mounted on one end of an arm 59 that is fast on a horizontal rock shaft 60. This rock shaft also carries another arm 61 which is forked at its forward end and is connected by means of a pair of links 62 to the upper end of the mandrel 52. Accordingly, the movement of the lever 59 produced by the cam 56 oscillates the rock shaft 60 and this movement is transmitted through the lever 61 and links 62 to the mandrel 52, moving this mandrel up and down on the pair of stationary guide rods 63 at opposite sides of the mandrel.

The material to be packaged is introduced into the carton through the mandrel 52 which, for this purpose, is made hollow. If the material to be packaged is of a granular nature, as for instance, coffee, it preferably is introduced into a hollow plunger 65 mounted to telescope within the mandrel and having a tube 66 (see Fig. 9) projecting upwardly from one side through a slot 67 formed in the side of the mandrel 52. The charges of material to be packaged are introduced one at a time through this tube which may be connected to a weighing or measuring mechanism of any convenient type so that each charge will be weighed or measured before being delivered to the mandrel for packaging. If solid material is being packaged, as for instance, prints of butter, a hollow plunger also is used working within the mandrel, but in the latter case the plunger has an open side. In either construction it is necessary to move the plunger up and down independently of the mandrel 52, and for this purpose the plunger is connected to a rod 68 (Fig. 10) mounted to move vertically in suitable guides and driven by a cam 69 fast on the shaft 58.

An ejecting plunger 70 also is mounted within the hollow plunger 65 and has just enough clearance within the walls of the plunger 65 to permit it to move freely while still enabling it to eject from the hollow plunger the entire charge of material that it contains. This ejector 70 is fast on the lower end of the rod 71 which is moved up and down by a cam 72 that rotates with the shaft 58.

Figures 10, 11:
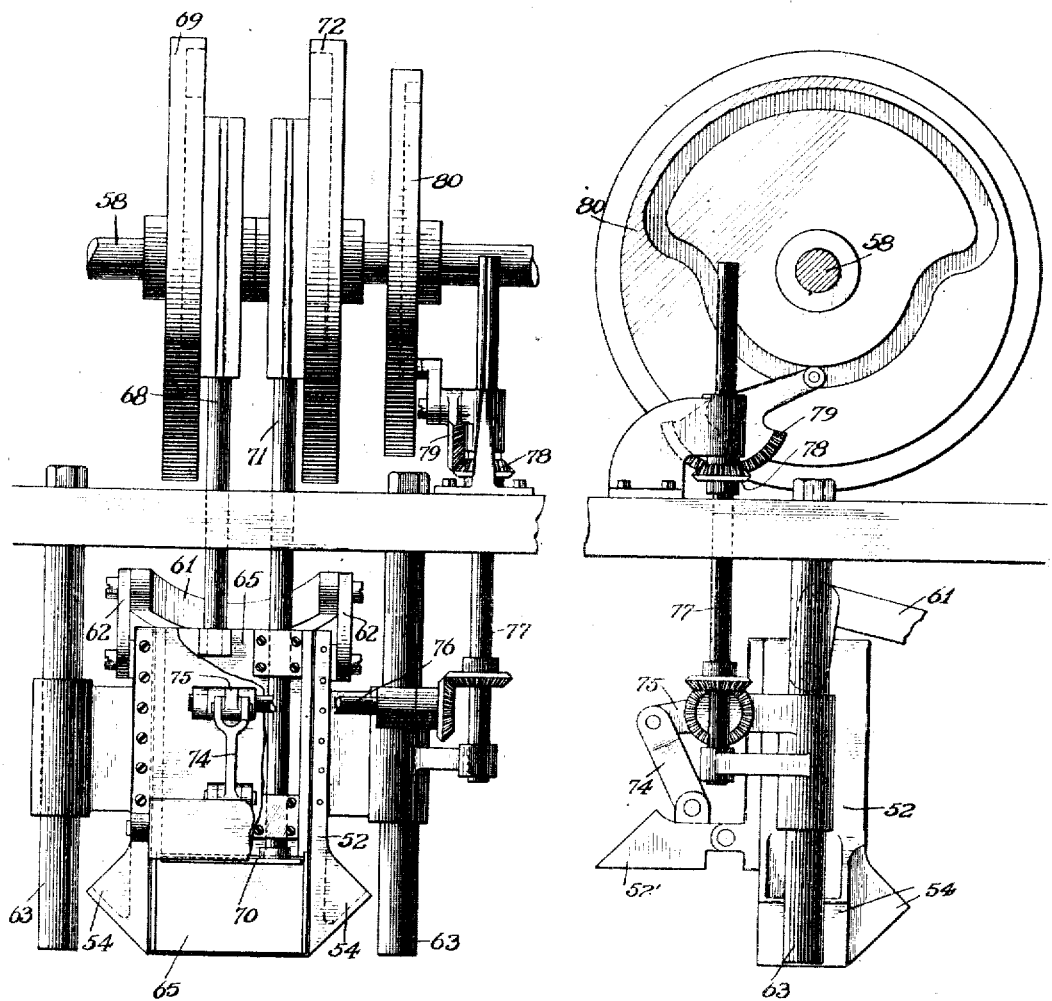
Fig. 10 is a view similar to Fig. 8 showing a slightly different form of carton filling mechanism.
Fig. 11 is an end view of the mechanism shown in Fig. 10.
Figure 16:
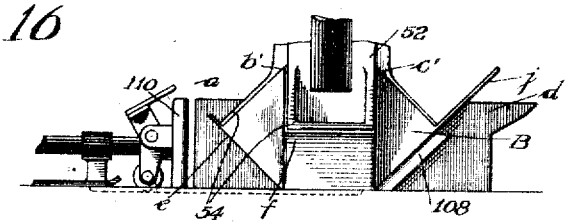
Figure 17:
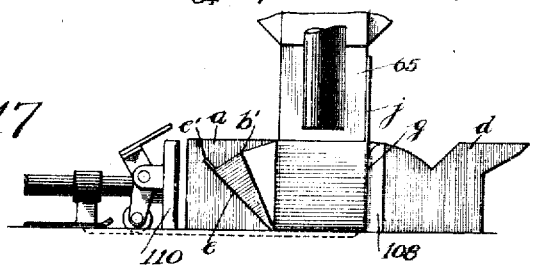
Figure 18:
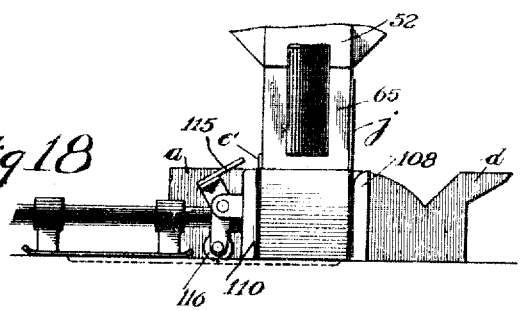

When the machine is intended to package material in the form of a brick or cake a mandrel of modified construction is used. This construction is shown in Figs. 10 and 11 from which it will be seen that this form of mandrel is provided with a hinged side 52' which is arranged to swing from a closed position in which it forms, to all intents and purposes, an integral part of the mandrel, to an open position in which it is shown in Fig. 11 where it permits the introduction into the mandrel of the article to be packaged. The movement of this hinged member 52' is effected by means of a link 74 pivotally connected to the mandrel 52 and also connected to an arm 75 projecting from and fast on a shaft 76 that is operated by miter gear connections with the shaft 77 which, in turn, is driven by a miter gear 78 and a sector 79 having an arm carrying a roll that runs in the cam track of a cam 80 fast on the shaft 58. This cam track is designed to oscillate the sector 79 which, through the bevel gear 78 and shaft 77 and its connections with the hinged member 52' of the mandrel, opens and closes this mandrel at the proper times in the cycle of operation of the machine. The shaft 77 is keyed to but can slide through the gear 78 as the mandrel moves up and down. When this construction of mandrel is used, the hollow plunger 65 within the mandrel also is cut away on one side to provide an opening corresponding to and registering with the opening in the mandrel so that an article placed between the guides 81 and on the feeder 82 (see Figs. 1, 3 and 7) will be fed into the mandrel and into the hollow plunger 65 through the openings in the sides of these two members. The door 52' then begins to close, thus holding the article in the mandrel while the feeder 82 withdraws. The feeder has an apron, or floor, that slides under the mandrel and prevents the article from dropping out of the mandrel until the door has completely closed, and pinches the article against the opposite inner wall of the plunger with sufficient force to keep it from dropping out of the plunger. The mandrel then is in condition to perform its functions as a part of the carton folding mechanism.

The feeder 82 is carried by a cross-head that reciprocates on a pair of horizontal guides 84 (see Figs. 1, 2 and 7), movement being imparted to this cross-head by means of a lever 85 connected by a link 86 to the cross-head and operated by a cam 87 that rotates with the main shaft 8.

Both the mandrel 52 and the hollow plunger 65 are open at the bottom for the purpose of facilitating the introduction of the charge of material in the plunger into the carton. In order to hold this charge in the hollow plunger until it is desired to discharge it and also for the purpose of holding the carton blank and its lining properly for the preliminary folding operations, another plunger 90 (see Figs. 3, 4 and 7) is arranged below the mandrel and consists of a flat head secured on the upper ends of two rods 91 which are mounted in suitable guideways formed in the machine frame to slide up and down. The movements of the plunger necessary to enable it to coöperate with the mandrel in the manner above indicated are produced by a cam 92 (see Fig. 2) fast on the shaft 8, this cam being arranged to operate a rod 93 connected with one end of a lever 94, the other end of which is connected by a pair of links 95 to a cross-head 96 that carries both of the rods 91.

Figure 8:
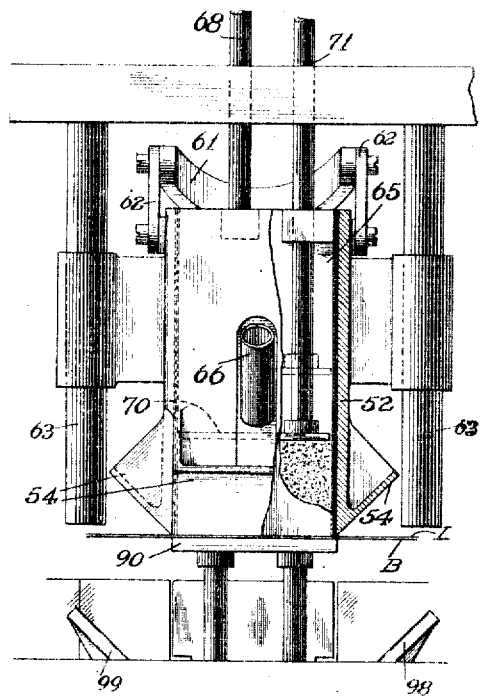
Fig. 8 is an elevation partly in section of the carton filling mechanism of the machine.
Figure 9:
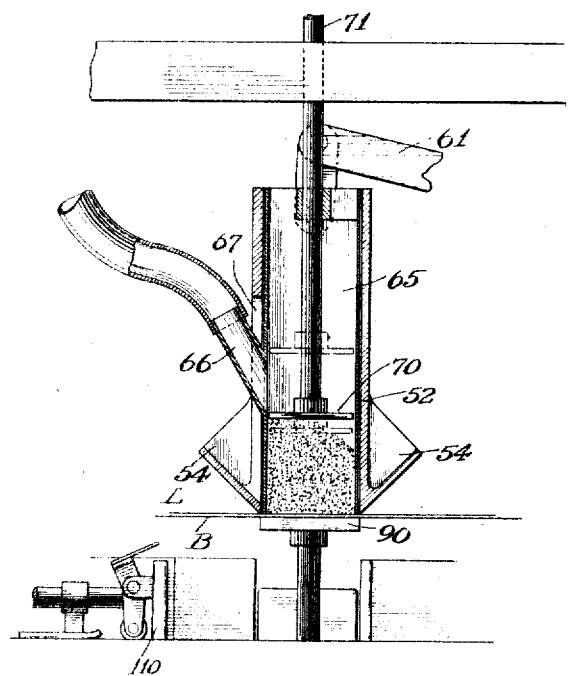
Fig. 9 is a central vertical sectional view of the mechanism shown in Fig. 8.

The movements of the plunger 90 are so timed with reference to the movement of the other parts above described that, when the carton blank and its lining have been delivered in position for the operation of the folding mechanism, the plunger 90 comes up through the die 53, picks up the carton blank and its lining and carries them up and presses them firmly against the bottom of the mandrel 52 and the hollow plunger 65. Figs. 8 and 9 show the parts in the positions just described. If granular material is to be packaged the charge is delivered to the mandrel at this time. If a solid article is to be packaged it is delivered to the mandrel and the door 52' is closed before the plunger 90 reaches the mandrel. The ejecting plunger 70 settles or compresses the charge if the material is loose, and the members 52, 65, 70 and 90 then descend together carrying the carton blank and carton lining down into the folding die 53 into the position shown in Fig. 16, thus folding the carton blank and its lining up into the shape illustrated in Fig. 25. The corners of the parts $a$, $b$, $c$ and $d$ of the die 53 coöperate with the respective reëntrant angles formed by each pair of adjacent end faces of the wings 54 to make the folds indicated at $a'$, $b'$, $c'$ and $d'$ in Fig. 25 while the outer inclined faces of the wings 54 shape the sides of the carton as indicated at $e$, $f$, $g$ and $h$.

Figure 26:
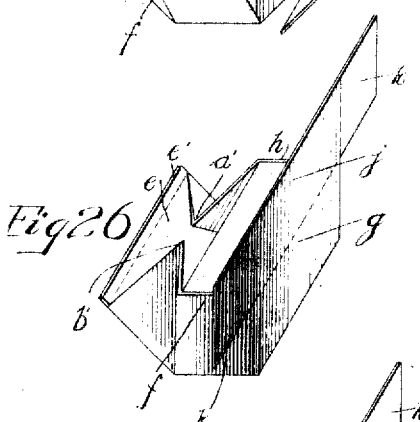
Figure 27:
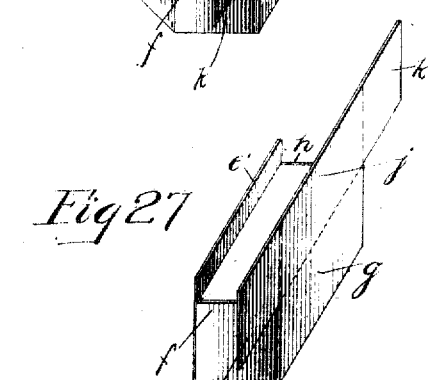
Figure 28:
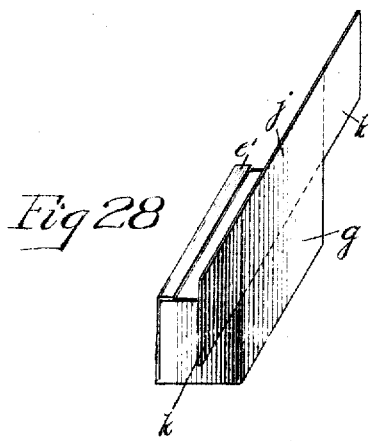
Figure 29:
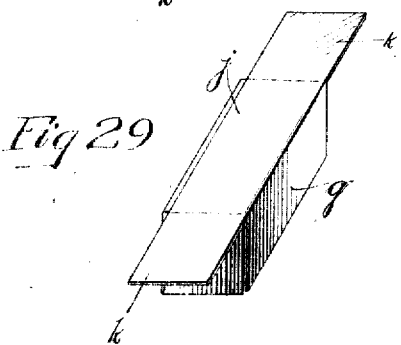
Figure 30:
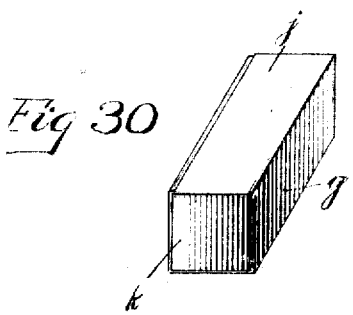

In the space between the blocks $b$ and $c$ an end folder 98 is mounted to swing from an inclined position into substantially a vertical position and in the space between the parts $a$ and $d$, another end folder 99 is mounted for a similar swinging movement. These folders each consists of a bell crank lever swinging on a stationary fulcrum positioned just below the folding die 53 and they are connected by links 100 and 101, respectively, to the opposite ends of an arm 102 (see Figs. 3 and 4) that is fixed to and projects at equal distances from the opposite sides of a rock shaft 103. Another arm 104, fixed to this shaft, is pivoted to a rod 105 that is operated by a cam 106 (see Fig. 1) on the shaft 34. When the folders 98 and 99 are operated by the connections just described to swing them into their vertical positions, they fold the ends $f$ and $h$ of the carton shown in Fig. 25 up into the positions in which these parts are shown in Fig. 26. This folding operation begins as soon as the mandrel 52 starts to withdraw or rise out of the die 53, which motion takes place immediately after the mandrel has reached the lower limit of its stroke. The plunger 90 at this time has reached the lower limit of its stroke where it remains until the carton has been filled and ejected from the die. While the mandrel 52 is rising, the hollow plunger 65 and the ejector 70 remain stationary, the plunger serving as a form about which the carton is folded up. Since the wall of this plunger is very thin, it does not make the carton substantially larger than is required for the charge to be packaged.

The ends $f$ and $h$ of the carton having been folded up, it is next necessary to fold up the sides $e$ and $g$ of the carton. The side $g$ is folded by means of a swinging folder 108 (see Fig. 3) pivoted just below the folding die and lying between the members $c$ and $d$. This folder has an extension projecting below its pivot and a spring 109 connected to this extension and to a stationary part of the machine, tends to hold the folder in an upright position. It is forced out of this position upon the descent of the mandrel 52 into the die by one of the wings 54, but as soon as the mandrel begins to rise, the spring 109 starts to swing the folder 108 up into its vertical position and ultimately folds the side $g$ of the carton up into the position shown in Figs. 17 and 26.

The side $e$ of the carton is folded up by means of a plunger 110 that is mounted to slide horizontally from a position at the left of the die, as the parts are seen in Figs. 3 and 7, through the die and to a considerable distance past the die. This plunger consists of a vertical plate mounted in the forward end of a plunger rod 111, which is secured to the cross head 82, forming part of the article feeding devices and operating in the manner above described. The forward movement of this plunger 110 from the position shown in Fig. 17 to that shown in Fig. 18 folds the flap $e$ up against the side of the hollow plunger 65 or against the side of the article being packaged if that article is in the form of a cake. (See Fig. 27.) The bottom and four sides of the carton are now folded up in their final form, thus preparing the carton for filling. At this point, the hollow plunger 65 is raised, the ejector 70, however, remaining at the lower limit of its stroke until the bottom of the hollow plunger becomes substantially flush with it, thus forcing into the carton the material which, up to this point, has been contained in the hollow plunger. Both the hollow plunger and the ejector 70 then return to their upper positions in readiness to receive another charge of material.

Figure 19:
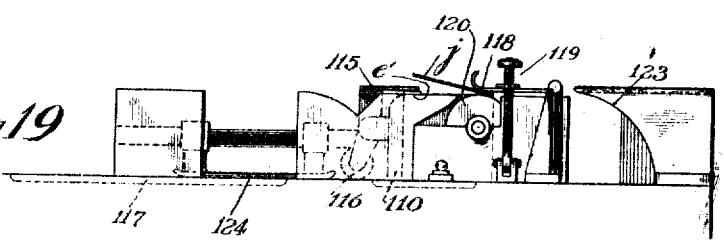

The plunger 110 pauses in its movement during the withdrawal of the hollow plunger 65 but when this withdrawal movement has been completed, the plunger 110 again moves forward, pushing the carton just filled out of the die and over the folder 108 which yields or folds down to permit this movement. This plunger has pivoted to its rearward side a tucker consisting of a bell crank lever having at one end a lip 115 adapted to swing over the top of the plunger 110 and at its opposite end a roll 116 that runs, during the first part of the stroke of the plunger, in a groove 117 (see Figs. 3 and 19) formed in the parts over which the plunger slides. The weight of this tucker is so disposed with reference to its pivot that, so long as the roll 116 is in the groove 117, the tucker is held in its inoperative or tilted back position. This groove, however, extends only part way along the path of travel of the plunger and, when the roll arrives at the end of the groove, it swings the tucker forward over the top of the plunger 110 and lays down the flap $e'$ that projects up above the sides of the carton. The carton is then in the condition shown in Fig. 28. The tucker holds the flap $e'$ in this position until after the top $j$ of the carton has come in contact with the stationary folder 118 (see Figs. 3, 7 and 19), which folds the top of the carton flat on the top of the package and over the flap $e'$. The tucker 115 moves back into its inoperative position just as the flap $j$ comes in contact with it. The carton now is in the condition shown in Fig. 29, all the folds being completed except the two end flaps $k$ which project horizontally from the top of the package. The folder 118 lies across the channel through which the package is moved and the parts forming the walls of this channel and is pivoted as shown in Figs. 7 and 19, so that it can yield upwardly as the flap $j$ strikes it. A pair of springs 119, encircling small rods that project through the folder, bear on it and resist its upward movement.

The end flaps $k$ are forced to slide across the tops of a pair of glue applying rollers 120 mounted one at each side of the channel through which the carton passes and under the stationary folding plate 118. A strip of glue has already been applied to the upper edge of the flap $j$ as indicated at $m$, Fig. 24, by means of a glue applying roller 122 (see Figs. 5, 6 and 7) mounted at the side of the nozzle 24 through which the carton blank is dragged on its way to the folding mechanism, the lining being narrower than the blank, as shown in Fig. 24, to permit this operation. Accordingly, when the flap $j$ is folded down over the flap $e'$, this strip of glue will seal these two flaps together.

As the carton is pushed out from under the stationary folder 118, the two end flaps $k$ engage stationary inclined folders 123 mounted, respectively, at opposite sides of the guideway or channel, and these folders turn down both end flaps of the carton and complete the folding of the carton, the glue previously applied to the flaps serving to secure them to the ends of the carton. The carton is then in the condition shown in Fig. 30.

The plunger 110 leaves the carton when it has moved the carton past the glue wheels 120 and returns to the opposite limit of its stroke in readiness to repeat its cycle of operations. Each carton pushes its predecessor along through the channel. In order to prevent the folder 108 from rising behind the plunger 110, and interfering with its return movement, the plunger rod 111 carries a depending shoe 124 (Fig. 3) that holds this folder in its depressed position until the plunger has returned.

While the plunger 110 is pushing a carton out of the stationary folding die and carrying it past the folders 118 and the glue rollers 120, the feeder 82 is pushing another cake of material into the mandrel. In the present arrangement it is proposed to use the feeder 82 only for introducing material into the mandrel that can not be delivered through the chute 66. While the feeder 82 and the plunger 110 are driven by the same cam in the machine shown, it is obvious that they may be driven independently; and such an arrangement may be desirable under some circumstances, as for instance, where it is preferred to use a feeder similar to that shown in the drawings for carrying material into the mandrel and to have the plunger 90 closing the lower end or mouth of the mandrel when the material is introduced. These changes obviously come within the scope of the present invention.

When the plunger 110 moves a carton past the folder 118 and the gluing devices, this carton pushes a preceding one against a yielding stop 126 at the end of the guideway and on to a plunger 127 (see Fig. 3) which carries the carton through the mechanism that folds the outside wrapper about it. The wrapper in which the carton is to be wrapped is fed out on the top of a table 128 (see Figs. 3, 7 and 20) from a magazine 129 by means of a stripper roll 130 in a manner well understood by those skilled in this art. A needle 131 is arranged to project through an opening in the bottom of the magazine at the side opposite the stripper roll 130 and to hold the wrapper sheets other than the bottommost one from being fed forward by the stripper. The stripper roll is driven by a sprocket and chain and connection with the shaft 34. As soon as the carton is fed on to the plunger 127 and the wrapper w, which is to be folded about the carton, is fed over the table 128, the plunger 127 rises enough to carry the carton up through an aperture in the table 128 and into contact with the wrapper. A plunger 132, which is mounted to slide vertically through a folding box above the table then drops through the box and rests on top of the carton and the wrapper. A spring 133, surrounding the stem of this plunger, tends to force it downwardly while a dash pot 134, through which the stem of the plunger slides and positioned above the folding box, co-operates with a piston on the end of the plunger stem to arrest this motion gradually when the plunger has nearly reached the limit of its stroke and thus prevents the plunger from striking the package too hard. This plunger holds the wrapper against displacement relatively to the carton during the folding operations.

The plunger 127 is mounted on the upper end of a rod 135 that reciprocates vertically in suitable guides formed in the machine frame and has formed along one edge a series of teeth constituting a rack. A stationary rack 136 is arranged adjacent the rack formed on the stem 135 and a pinion 137 (see Fig. 20) meshes with the teeth of both of these racks and is mounted to have a bodily movement up and down, this movement being produced by a cam 138 which oscillates a lever 139 carrying a pair of links 140 between which links the pinion 137 is mounted to rotate. The cam 138 is fast on the rotary shaft 34. This mechanism gives to the plunger 127 a movement of double the bodily movement of the pinion 137. The plungers 127 and 110 operate in timed relationship to each other so that the plunger 110 effects a proper delivery of the carton to the plunger 127 before the latter plunger starts upward. The upward movement of the plunger 127 carries the carton and the wrapper w that is held on top of the carton by the plunger 132 up through a folding box 142 of a common construction. The sides of the box fold the wrapper against the sides of the carton while a pair of end tucking plates, one of which is indicated at 143, Fig. 21, makes the trucks n, Fig. 32, at the opposite ends of the package. The package is shown in Figs. 31 to 37 in a reversed position from that which it assumes in going through the folding box for the purpose of better showing the successive folding operations. The box also is provided with two sets of members 144 and 145 having oppositely inclined edges that fold down the flaps o and p one over the other against the ends of the package, leaving it in the form shown in Fig. 34. Accordingly, when the plunger has carried the carton to the upper end of the folding box, the wrapper will have been folded about the top, the two ends and two sides of the carton, leaving only the folding operations to be performed on the bottom in order to complete the wrapping operation. A lateral opening 146 is provided at the upper end of the folding box to permit the carton to be ejected after the wrapping operation has been completed. This opening normally is closed by a pivoted door 147 operated through connections 148 with a cam 150 having a cam way in its end surface and fast on a shaft 156.

As soon as the plunger 127 has carried the carton into a position opposite the opening 146 the plunger returns to the lower limit of its stroke. In order to hold the package in this position after the support of the plunger has been withdrawn, another plunger 152, working at right angles to the plunger 127, is mounted near the top of the folding box 142 and opposite to the opening 146, this plunger also serving as an ejector. The stem of the plunger 152 is reduced or grooved, as indicated at 153 (Fig. 21) and one end of a lever 154, fulcrumed on a bracket projecting from the back of the folding box 142 has a forked part that straddles this reduced part 153, the opposite end of said lever carrying a cam roll that runs in the groove of a cam 155, which is mounted on a shaft 156. This shaft is driven by a chain 157 running over a pair of sprockets, one mounted on the shaft 156 and the other on the shaft 58. The groove of the cam 155 is designed to move the ejector 152 forward toward the door 147 just before the plunger 127 descends so as to push the carton against the door and hold it in this position.

Figure 35:
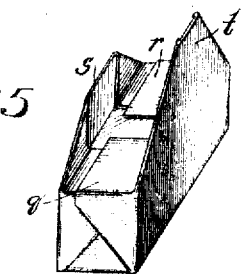
Figure 33:
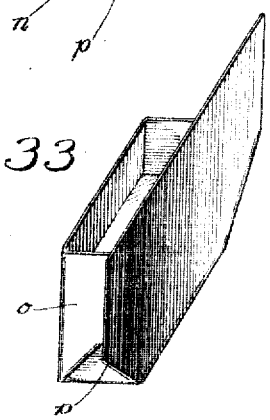
Figure 36:
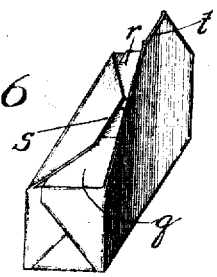

The wrapper is next tucked in on the ends at the bottom of the package, as indicated at $q$ and $r$, Fig. 35, by a pair of oppositely reciprocating tuckers 160 and 161, Fig. 22, which are mounted to slide horizontally toward and from each other in guideways formed in brackets projecting from the sides of the folding box 142. Two levers 162 and 163, connected, respectively, to the tuckers 160 and 161, carry rolls running respectively, in peripheral cam grooves 164 and 165, one formed in the cam 150 and the other in the cam 166, both mounted on the shaft 156. The cam grooves 164 and 165 are designed to move the tuckers 160 and 161 toward each other to cause them to make the tucks $q$ and $r$ shown in Fig. 35 and then to withdraw said tuckers again so that they will not obstruct the path in the folding box through which the carton passes.

Figure 37:
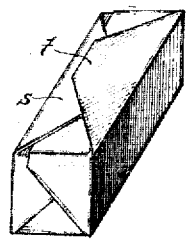

Two side flaps $s$ and $t$ (see Fig. 35) are now left projecting below the bottom of the carton. The flap $s$ is folded against the carton by means of a swinging folder 170 (see Figs. 21 and 22) pivoted in the back of the folding box 142 and operated by a rod 171 carrying a roll that runs in a groove formed in the end of the cam 166. When this fold has been made, the door 147 of the folding box is opened by the cam 150 and the ejector 152 is operated by its cam 155 to force the carton laterally out of the folding box and into a discharge chute 173. As the carton passes through the opening 146, the last flap $t$ of the wrapper is folded against the bottom of the package by its contact with the lower edge of the opening 146. This completes the wrapping of the carton which now appears substantially as shown in Fig. 37.

Figure 31:
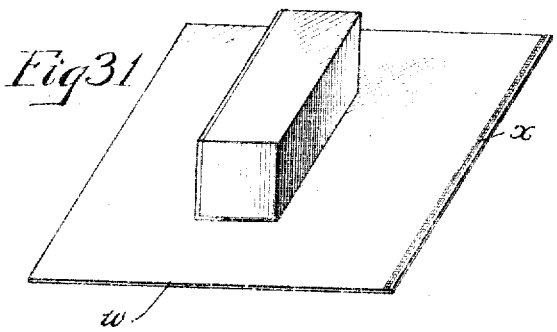
Figure 34:
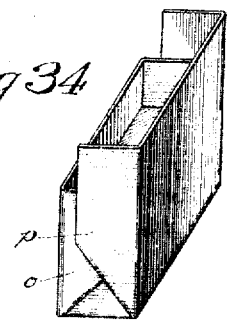
Figure 32:
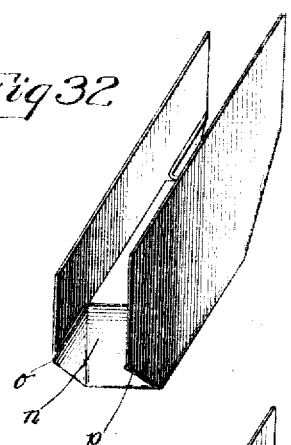

If it is desired to have the wrapper glued, a small glue pot 175 (see Fig. 21) may be set under the table 128 of the sheet feeding mechanism and at one side of said table so that the gluing roll 176 with which an apparatus of this sort usually is equipped will apply a strip of glue along one edge of the wrapper as indicated at X in Fig. 31 while the wrapper is being fed on to the table 128. This glue applying roll may conveniently be driven from the stripper roll 130 through a clutch 177 consisting merely of a pair of disks, one permanently fixed to the roll 130 and the other on the same shaft as the glue roll 176, one of these disks having a tongue and the other a groove into which said tongue may fit. By this arrangement the glue applying attachment may slide into or out of its operative position as desired without disturbing the operation of any of the other parts of the machine. When this gluing appliance is used, the tucks $q$ and $r$ will be glued down and the flap $t$ will be secured to the flap $s$.

The operation of the various mechanisms and devices of the machine has been so fully explained in the foregoing description that any further explanation is believed to be unnecessary. It will be understood, of course, that the term "carton" is used herein in the ordinary sense in which it is employed in this art to designate a box made of pasteboard and similar relatively stiff materials.

It is obvious that, if it is desired to package the merchandise without using a carton lining, it is merely necessary to trip the stop 49 and pull the lining strip L back in the chute 43 far enough to be out of the reach of the gripper 25. If the machine then is operated in the manner above described the merchandise will be inclosed in an unlined carton and that carton will be wrapped in an outer wrapper. If it is found desirable to omit the wrapping of the carton, it is merely necessary to disconnect the mechanism that operates the stripper roll 130. Or the entire wrapping mechanism may be disconnected and a delivery chute arranged to conduct the cartons away from the machine from the point where they are delivered to the plunger 127.

Having thus described my invention, what I claim as new and desire to secure by Letters Patent of the United States is:

1. In a machine of the character described, the combination with mechanism for partially folding a carton blank to prepare the carton for filling, of a magazine for carton blanks, means for holding a supply of lining material for the cartons, mechanism for feeding a carton blank and a carton lining to said folding mechanism, means coöperating with said folding mechanism to fill the carton, and means operative thereafter to complete the folding operations on the carton to close it.

2. In a machine of the character described, the combination with devices movable vertically for folding a carton for filling, means for filling the carton so folded, mechanism for moving said carton horizontally, means operative during said movement to close the carton, wrapping devices operative during a further vertical movement of the carton to partially fold an outer wrapper about the carton, means for moving said carton to subject it to the operation of said devices, means for moving the carton with its wrapper horizontally after said devices have folded the wrapper and means operative to complete the folding of the wrapper about the carton to completely inclose it during such horizontal movement.

3. In a machine of the character described, the combination with a mandrel, of a stationary folding die constructed to fold a carton blank, means for introducing a carton blank between said mandrel and said die, mechanism for moving said mandrel into said die to force said blank into said die and fold the blank about said mandrel, means for introducing the material to be packaged through the mandrel into the carton so folded, and means for closing said carton.

4. In a machine of the character described, the combination with a mandrel, of a stationary folding die having stationary folders constructed to partially fold up a carton, means for introducing a carton blank between said mandrel and said die, mechanism for moving said mandrel into said die to force said blank into said die and fold the blank about said mandrel, means for introducing into the carton so formed the material to be packaged, and means for making additional folds in the carton while it is in said die.

5. In a machine of the character described, the combination with a mandrel of a folding die, means for introducing a carton blank between said mandrel and said die, mechanism for relatively moving said mandrel and die to force said blank into said die and partially fold the blank into the form of a carton, movable folders for completing the folding of the sides of the carton while it is in said die, means for moving the carton out of the die and means for folding down the flaps of the carton to close it after it has been moved out of the die.

6. In a machine of the character described, the combination with a mandrel and folding means arranged in vertical alinement therewith, of mechanism for introducing a carton blank horizontally between the mandrel and said means, said folding means and mandrel being arranged to fold the blank to form the bottom and sides of a carton, means for moving the carton laterally out of and away from the folding means, and means for closing the flaps of the carton after it has been moved away from said folding means.

7. In a machine of the character described, the combination with a mandrel and a die constructed and arranged to fold up a carton of prismatic form, said die comprising parts fixed relatively to each other for forming the vertical edges of the carton and movable folders operative to complete the folding of the sides of the carton while it is in said die.

8. In a machine of the character described, the combination with a hollow mandrel, of means coöperating with said mandrel to prepare a carton blank for filling, a hollow plunger telescoping within said mandrel and constructed and arranged to introduce into the carton so prepared the material to be packaged, means for relatively moving the mandrel and plunger to withdraw the mandrel from the carton while leaving the plunger in the carton and folding devices arranged to operate on the carton while the plunger is in the carton.

9. In a machine of the character described, the combination with a hollow mandrel, of means coöperating with said mandrel to prepare a carton blank for filling, a hollow plunger telescoping within said mandrel and constructed and arranged to introduce into the carton so prepared the material to be packaged, said mandrel having a lateral opening permitting the introduction of said material into said plunger.

10. In a machine of the character described, the combination with a hollow mandrel, of means coöperating with said mandrel to prepare a carton blank for filling, a hollow plunger telescoping within said mandrel and operative to introduce into the carton so prepared the material to be packaged, means for relatively moving the mandrel and plunger to withdraw the mandrel from the carton while leaving the plunger in the carton, folding devices arranged to complete the folding of the sides of the carton while the plunger is in it, means for causing the plunger to discharge its contents into the carton and to withdraw from the carton, and folding devices arranged to close the carton flaps after the plunger has been withdrawn.

11. In a machine of the character described, the combination with mechanism for folding a carton blank, of gripper mechanism for delivering a carton blank to said folding mechanism, a magazine for carton blanks, means for moving the bottommost blank in the magazine into position to be grasped by said gripper, and means for positioning a carton lining to be grasped by said gripper when it grasps the carton blank, whereby a carton blank and its lining will be fed to the folding mechanism together.

12. In a machine of the character described, the combination of a folding die having stationary folding members, a mandrel having an outer surface shaped to coöperate with said stationary members to partially fold a carton, a hollow plunger telescoping within said mandrel through which the charge to be inserted in the carton may be introduced, means for relatively moving said plunger and mandrel to withdraw the mandrel from the partially formed carton while the plunger remains in said carton, and movable folding devices coöperating with said plunger to perform additional folding operations on the carton while the plunger remains in it.

13. In a machine of the character described, the combination of a folding die having stationary folding members, a mandrel arranged to coöperate with said die to partially fold a carton blank, said mandrel having extensions projecting therefrom serving to coöperate with said stationary members to hold parts of the carton in substantially predetermined positions, means for moving said mandrel into and out of said die, a hollow plunger telescoping within said mandrel and constructed to introduce a charge into the carton partially formed in the die, and movable folders coöperating with said plunger to perform additional folding operations on the carton.

14. In a machine of the character described, the combination of a folding die having stationary folding members, a mandrel, means for introducing a carton blank between said mandrel and die, mechanism for relatively moving said mandrel and die to force said blank into said die and fold it about said mandrel, said mandrel having extensions projecting laterally therefrom arranged to coöperate with said stationary members in performing said folding operations, and means additional to said stationary members for performing additional folding operations on said blank while it is in said die.

15. In a machine of the character described, the combination of a folding die having stationary folding members, a mandrel, means for introducing a carton blank between said mandrel and die, mechanism for relatively moving said mandrel and die to force said blank into said die and fold it about said mandrel to partially form the sides of a carton, and means for making additional folds in the sides of the carton while it is in said die.

16. In a machine of the character described, the combination of a hollow mandrel, folding mechanism coöperating with said mandrel to partially form a carton about said mandrel, a hollow plunger movable in said mandrel and through which the charge of material to be packaged may be introduced into said carton, and means for performing additional folding operations on said carton while said plunger is in it.

17. In a machine of the character described, the combination of a folding die, a mandrel, means for introducing a carton blank between said mandrel and said die, mechanism for relatively moving said mandrel and die to force said blank into said die and fold the blank about said mandrel, said die having projections extending laterally therefrom arranged to coöperate with parts of said die to perform side folding operations on the carton, means for introducing a charge of material to be packaged into the carton while it is in said die, and movable folding devices operative to make additional folds in the sides of the carton while it is in said die.

In testimony whereof I have affixed my signature, in presence of two witnesses.

HARRY YARRINGTON ARMSTRONG.

Witnesses:
 WINIFRED NELEN,
 JOHN H. MCCREADY.